(12) United States Patent
Aharonson et al.

(10) Patent No.: US 6,339,655 B1
(45) Date of Patent: Jan. 15, 2002

(54) HANDWRITING RECOGNITION SYSTEM USING SUBSTROKE ANALYSIS

(75) Inventors: Eran Aharonson, Ramat Hasharon; Yuval Davidor, Herzelia; Doron Davidov, Givataim; Gabriel Ilan, Tel Aviv, all of (IL)

(73) Assignee: Art Advanced Recognition Technologies Inc., Simi Valley, CA (US)

( * ) Notice: Subject to any disclaimer, the term of this patent is extended or adjusted under 35 U.S.C. 154(b) by 0 days.

(21) Appl. No.: 08/730,253

(22) Filed: Oct. 15, 1996

Related U.S. Application Data

(63) Continuation of application No. 08/282,187, filed on Jul. 28, 1994, now abandoned.

(30) Foreign Application Priority Data

Jun. 27, 1994 (IL) .................................................. 110137

(51) Int. Cl.⁷ .................................................. G06K 9/62
(52) U.S. Cl. ...................................... 382/186; 382/201
(58) Field of Search ................................ 382/155, 186, 382/187, 201, 202, 226

(56) References Cited

U.S. PATENT DOCUMENTS

| | | | |
|---|---|---|---|
| 3,930,229 A | 12/1975 | Crane et al. | 340/146.35 Y |
| 4,190,820 A | 2/1980 | Crane et al. | 340/146.35 G |
| 4,284,975 A | 8/1981 | Odaka | 340/146.3 J |
| 4,317,109 A * | 2/1982 | Odaka et al. | 382/187 |
| 4,561,105 A * | 12/1985 | Crane et al. | 382/185 |
| 4,646,351 A * | 2/1987 | Asbo et al. | 382/187 |
| 4,653,107 A * | 3/1987 | Shojima et al. | 382/187 |
| 4,685,142 A | 8/1987 | Ooi et al. | 382/13 |
| 5,050,219 A * | 9/1991 | Maury | 382/186 |
| 5,113,452 A | 5/1992 | Chatani et al. | 382/13 |
| 5,121,441 A * | 6/1992 | Chefalas et al. | 382/187 |
| 5,251,268 A * | 10/1993 | Colley et al. | 382/155 |
| 5,265,174 A | 11/1993 | Nakatsuka | 382/38 |
| 5,313,527 A | 5/1994 | Guberman et al. | 382/13 |
| 5,313,528 A * | 5/1994 | Wishida | 382/187 |
| 5,319,721 A * | 6/1994 | Chefalas et al. | 382/187 |
| 5,343,537 A * | 8/1994 | Bellegarda et al. | 382/186 |
| 5,392,363 A * | 2/1995 | Fujisaki et al. | 382/187 |
| 5,426,711 A | 6/1995 | Kitamura | 382/187 |

* cited by examiner

*Primary Examiner*—Andrew W. Johns
(74) *Attorney, Agent, or Firm*—Eitan, Pearl, Latzer & Cohen-Zedek

(57) ABSTRACT

A handwritten pattern and stroke recognition system recognizes an input pattern by comparing it to reference patterns. The input and reference patterns comprise at least one stroke, where a stroke is defined as the series of sample points from pen-down to pen-up. The system of the present invention compares the input and reference patterns stroke by stroke and thus, compares input strokes to reference strokes. The system includes a tangent and stable point extractor, a reference database and a stable-point-based classifier. The extracter determines tangents to at least some of the sample points of the input stroke and determines, which of the sample points between a beginning and end of the input stroke are stable points. The reference database stores tangents of sample points of the reference strokes and stable points of the reference strokes. The stable-point-based classifier divides each input stroke and each reference stroke into at least two substrokes wherein each substroke has at least one of the stable points at an end thereof. The classifier also generates stroke match values indicating the quality of the match between the input stroke and the reference strokes based on the comparison of substrokes of the input stroke with corresponding substrokes of the reference strokes. The classifier selects the reference stroke providing the best match to the input stroke in accordance with a matching criterion. Finally, the classifier selects the reference pattern whose strokes best match the strokes of the input pattern.

22 Claims, 6 Drawing Sheets

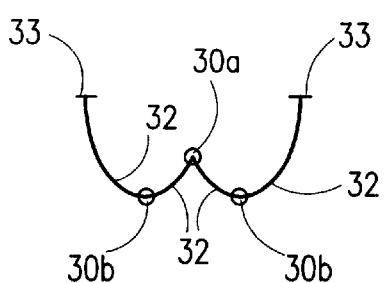
FIG.3A
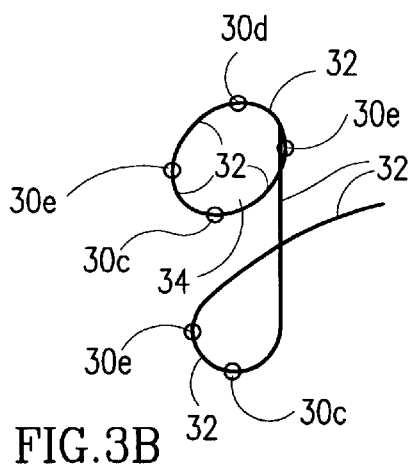
FIG.3B
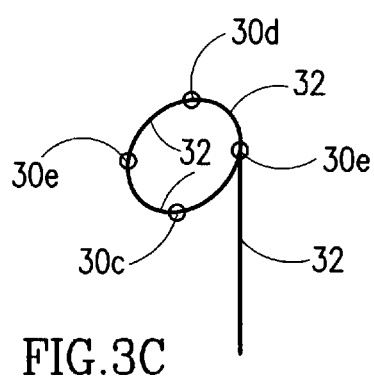
FIG.3C
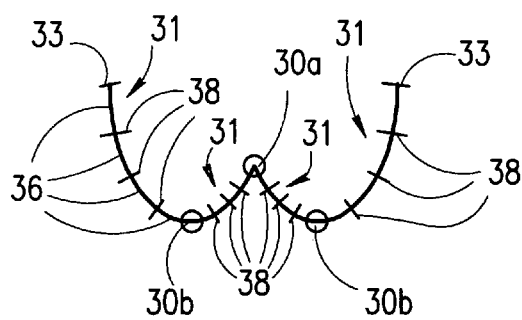
FIG.4
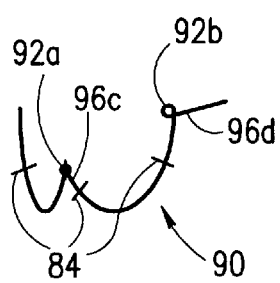
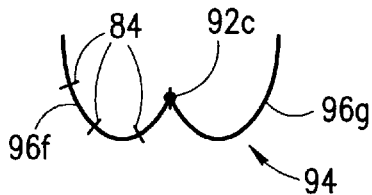
FIG.7F
FIG.7G

HANDWRITING RECOGNITION SYSTEM USING SUBSTROKE ANALYSIS

This application is a continuation of application Ser. No. 08/282,187, filed Jul. 28, 1994, now abandoned.

FIELD OF THE INVENTION

The present invention relates to pattern recognition systems in general and to systems for recognizing handwritten patterns, such as letters, numbers and signatures, in particular.

BACKGROUND OF THE INVENTION

Various pattern recognition systems are known in the art and they have varying degrees of success at recognition. These systems typically assume some particular structure of the characters (patterns) under investigation and utilize the structure to improve their recognition ability. For example, Kanji characters are formed of a plurality of strokes, defined as the points between pen-down and pen-up, where some characters have more strokes than others.

An example prior art system is shown in FIG. 1 to which reference is now made. It typically includes a digitizer 10, a segmenter 12, a feature extractor 14, a classifier 16 and a reference character database 18. The digitizer 10 converts an input pattern into a series of paired position (x,y) and sometimes also pressure P coordinates of sample points along the stroke. The segmenter 12 divides the input pattern into separate characters (i.e. if the input pattern was a handwritten "the", the segmenter 12 would divide the separate strokes into the characters "t", "h" and "e"). The feature extractor 14 extracts the features of each character and transforms each character into a standard format. The classifier 16 then compares the standardized input character against the standardized reference characters stored in the reference database 18. The reference character which has the best match, by some criterion or criteria, is output as the recognized character.

U.S. Pat. No. 3,930,229 to Crane et al. describes a system for identifying handwritten characters which codes the motion a pen follows when writing a character. Each character is defined as a sequence of primal directions, namely, up, down, rig However, the primal directions, without any other information, are not sufficient a result, the system is vulnerable to writing styles, noise and normal writing variation.

U.S. Pat. No. 4,284,975 to Odaka describes a handwriting identification system which takes the sample points of each stroke of each character and replaces them with two to five "feature points" which are equidistant points along the stroke. The distances between each feature point of the input pattern and its corresponding feature point of the patterns in the reference library are determined and the sum of the distances determined. The reference pattern with the smallest accumulated distance is the recognized character. This method is useful for characters formed of many relatively simple strokes, like Kanji characters but is not descriptive enough for general use and for complex, curved strokes.

U.S. Pat. No. 4,561,105 to Crane et al. describes a system where each stroke of a handwritten character is approximated by a polygon formed by connecting a fixed number of vertices at equidistant intervals. The angle of each polygon segment is calculated and is stored as a feature. The matching metric is defined as the sum of the differences between each angle in the input pattern and its corresponding angle in the reference pattern against which it is matched. The smallest value of the metric defines the recognized character.

The system of '105 cannot separate the noise in a character from the signal itself. For example, the system of '105 might define a handwritten "v" as a "u" since most of the equidistant vertices will fall on either side of the sharp angle change of the "v". It will also have trouble with other symbols for the same reasons. A further drawback of the system of '105 is that the number of vertices is fixed while, in reality, the number of vertices which is appropriate is highly dependent on the specific writing style of each user.

U.S. Pat. No. 4,190,820 also to Crane et al. describes a handwriting recognition system useful for recognizing signatures. The system compares strokes of a signature where the strokes are defined as extending between two landmarks, the pen-down and pen-up moments. The strokes are stretched or contracted, and translated to match corresponding strokes in the reference data.

SUMMARY OF THE PRESENT INVENTION

Applicants have realized that handwritten patterns, which include characters, symbols and signatures, have "stable points" through which a writer always moves when he writes the pattern. In effect, the stable points are the points by which a writer defines the pattern in his mind. For example, a "3" always has two curves which come together at a point, whether or not the two curves overlap or cross. The intersection point of the two curves is a stable point for the number "3".

It is an object of the present invention to provide a handwriting recognition system which extracts the stable points of strokes of a pattern, where a stroke is defined as the sample points between pen-down and pen-up. The system of the present invention includes a stable point extractor to extract the stable points of strokes and a classifier which utilizes the stable points to divide a stroke, of both an input and of reference patterns, into substrokes. The classifier then compares the input and reference substrokes to each other. As a result of the substroke creation, the system of the present invention compares substrokes of a pattern which are likely to have similar shapes.

It is noted that, if an input pattern is comprised of more than one stroke, the handwriting recognition system of the present invention only compares it with reference patterns having the same number of strokes, performing the stroke classification between the strokes of the input pattern with their corresponding strokes of the reference patterns.

The classifier preferably includes a comparison point apparatus for generating a multiplicity of comparison points which divide the substroke into a multiplicity of equal length intervals and for storing the local angle of the tangent at each comparison point. The classifier typically also includes a substroke comparison apparatus for generating, for each substroke, a value describing the comparison of the tangent angles of the comparison points of the input substroke with those of the corresponding reference substroke. Finally, the classifier typically also includes a matching apparatus for producing a match value describing the comparison over the whole stroke and over the whole pattern, if it is a multi-stroke pattern.

In one embodiment of the present invention, the substroke comparison apparatus generates differences between corresponding tangent angles of comparison points of the input substroke and the reference substroke. The match value is the sum, non-modulo 360 of the differences. Furthermore, the matching apparatus normalizes the match value for each substroke by the percentage of the entire stroke which the substroke occupies. The match value for the whole of the current reference pattern is the sum of the normalized totals. For multi-stroke patterns, the stroke match value is normalized by the percentage of the entire pattern which the stroke occupies and the pattern match value is the sum of the normalized stroke match values. The reference pattern with the smallest matching metric is the matched pattern.

The classifier can divide the stroke into substrokes in a number of ways and therefore, can be formed of any of a number of different matchers. A whole stroke matcher defines the entire stroke as being formed of only one substroke. A substroke matcher compares input strokes to those reference strokes having the same number M of stable points. A dynamic matcher matches the input stroke of M stable points to those reference strokes having M−k to M+k (k typically being less than 5) stable points and is useful since sometimes, a stable point is generated indicating a substroke, such as a serif, which is not a standard part of the pattern. For a given reference stroke having k more or k less stable points than the input stroke, the dynamic matcher repeats the substroke comparison many times, each time ignoring a different k of the stable points of the reference or input stroke, depending on which has the larger number of stable points. The matching metric for the reference stroke is the repetition with the lowest matching value for the stroke.

In accordance with another embodiment of the present invention, the classifier includes all of the whole stroke, substroke and dynamic matchers. The match value for the stroke is the smallest match value output of the three matchers.

BRIEF DESCRIPTION OF THE DRAWINGS

The present invention will be understood and appreciated more fully from the following detailed description taken in conjunction with the drawings in which:

FIGS. 3A, 3B and 3C are illustrations of patterns and their stable points, useful in understanding the operations of the recognition system of FIG. 2;

FIG. 4 is an illustration of a single pattern with its stable points and comparison points, useful in understanding the operations of the recognition system of FIG. 2;

FIGS. 7A, 7B, 7C, 7D, 7E, 7F and 7G are illustrations of input and reference patterns and the methods of comparing the two.

DETAILED DESCRIPTION OF A PREFERRED EMBODIMENT

Figure 1:
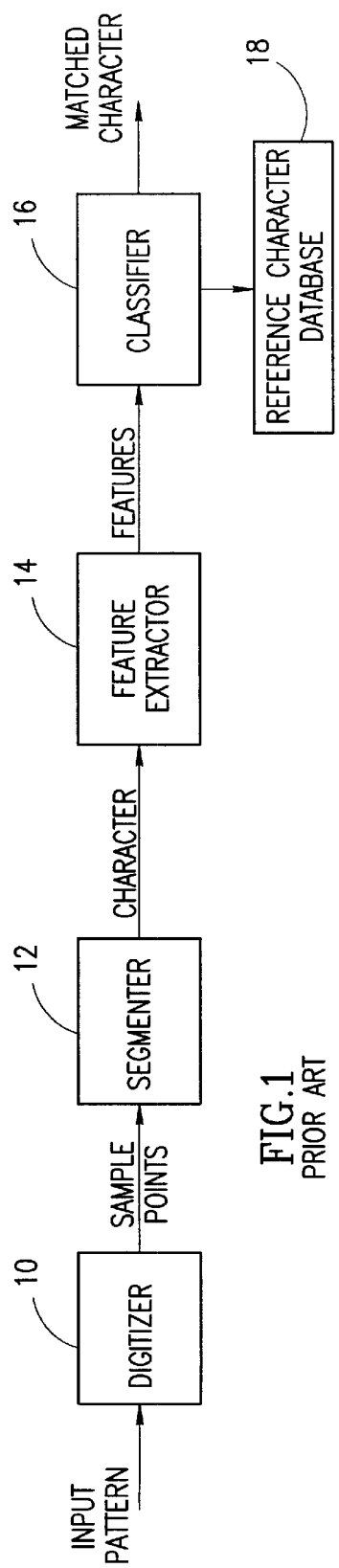
FIG. 1 is a block diagram illustration of a prior art handwriting classification system.
Figure 2:
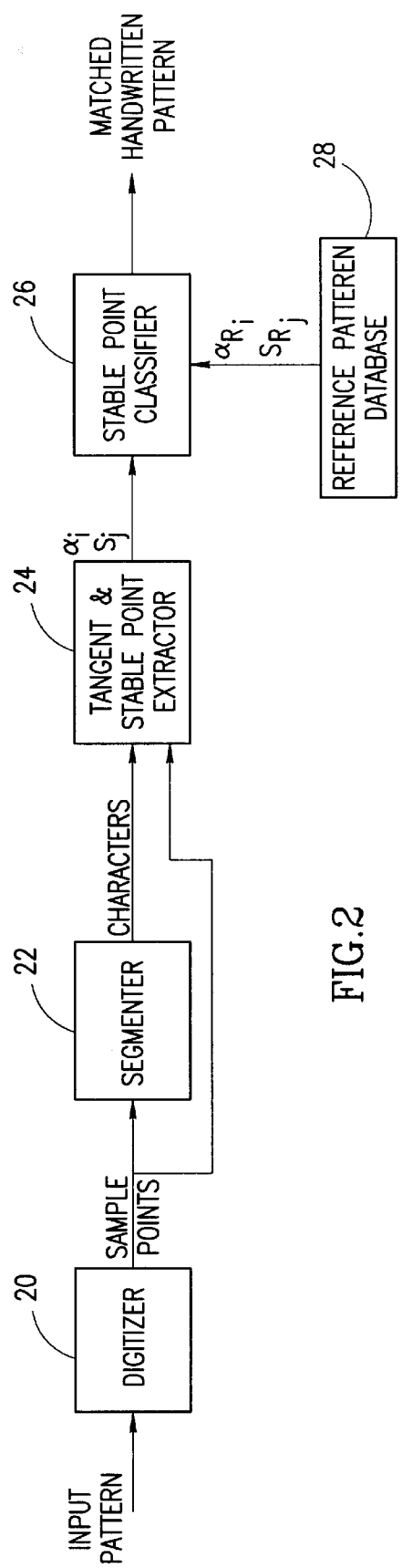
FIG. 2 is a block diagram illustration of a stable point handwriting recognition system constructed and operative in accordance with a preferred embodiment of the present invention.

Reference is now made to FIGS. 2, 3A, 3B, 3C and 4. FIG. 2 illustrates, in block diagram format, the handwriting recognition system of the present invention and FIGS. 3A, 3B, 3C and 4 are useful in understanding the operation of the system of FIG. 2.

The handwriting recognition system of the present invention comprises a digitizer 20, a segmenter 22, a tangent and stable point extractor 24 and a stable point pattern classifier 26. The digitizer 20 and segmenter 22 can be any type of digitizer and segmenter as are known in the prior art. The digitizer 20 converts an input pattern into a series of paired position (x,y) coordinates of sample points. The segmenter 22 groups strokes into single or multi-stroke patterns.

It is noted that, if an input pattern is comprised of more than one stroke, the handwriting recognition system of the present invention only compares it with reference patterns having the same number of strokes. In addition, the system of the present invention only compares the strokes of the input pattern with their corresponding strokes of reference patterns. The present invention will be described hereinbelow for single stroke patterns, it being understood that the operations are repeated for each stroke of the input pattern.

In accordance with a preferred embodiment of the present invention, the tangent and stable point extractor 24 determines the stable points $S_j$ and the tangent angles $\alpha_i$, of each sample point of the input stroke of the input pattern, where a tangent angle $\alpha_i$; is defined as the angle of the tangent to the curve of the stroke at the sample point i. This is detailed hereinbelow with respect to FIG. 5.

Examples of patterns and their stable points are illustrated in FIGS. 3A, 3B and 3C, for the letters "w" and "g" and for the numeral "9", respectively. The stable points $S_j$ are labeled 30 and the resultant substrokes are labeled 32. The stable points 30 of the letter "w" are at least the point of inflection, 30a, between the two halves of the letter and the locally lowest point of the curves of each half, labeled 30b. Other points can also be selected.

The stable points 30 of the letter "g" are the locally lowest points, labeled 30c, the locally highest points, labeled 30d, and the points, labeled 30e, indicating local extremum in the horizontal direction. Similarly for the number 9. It is noted that the beginning and end points of the stroke are not chosen.

The stable points 30 can be thought of as the dots used to teach a child how to write each pattern. These dots define the shape of the pattern in the mind of the child and therefore, he, whether as a child or as an adult, will always make sure to pass through the dots whenever he makes the letter. Therefore, the stable points 30 are "stable"; they will exist in the pattern no matter what changes the writer makes to the rest of the pattern. The same is true for a person's signature; there are certain inflections or curves which he or she will make each time.

Therefore, the stable points can be used to segment the strokes of an input pattern into substrokes which can then be compared to reference substrokes. This operation is performed by the stable point classifier 26.

In order to perform the comparison, the stable point classifier 26 first divides the stroke into one or more substrokes, where the single substroke is formed of the entire stroke and two or more substrokes are defined by at least some of the stable points of the stroke, as will be discussed in detail hereinbelow.

The classifier 26 divides each substroke of the input stroke into N equal intervals. The points where two intervals meet are called "comparison points". This is illustrated in FIG. 4 which shows a handwritten "w" with three stable points 30, one labeled 30a and two labeled 30b, dividing the letter into four substrokes 31. Each substroke 31 is divided into the same multiplicity of equidistant intervals 36 with comparison points 38 at the connections between the intervals 36. FIG. 4 shows four intervals 36 per substroke. Typically, more intervals 36 are utilized, for example, 10 intervals can be found.

Short substrokes, such as the substrokes between stable points 30b and 30a, will have short intervals 36 and long substrokes, such as the substrokes between the ends 33 of the letter and stable points 30b will have long intervals 36.

The classifier 26 has associated therewith a reference pattern database 28 having stored therein a multiplicity of reference patterns which typically include single and multi-stroke patterns. For each reference stroke of each reference pattern, the database 28 stores the reference tangent angles ah at each sample point and the stable points $S_{Ri}$.

The classifier 26 divides the input stroke and each reference stroke to be compared into the same number of substrokes and compares the substrokes of the input and reference strokes, producing a match value for each reference stroke. Typically, the comparison of each substroke is weighted by its portion of the input stroke. The reference stroke with the best match value is the identified stroke. These operations are detailed hereinbelow with respect to FIGS. 6, 8A, 8B and 8C.

Figure 5:
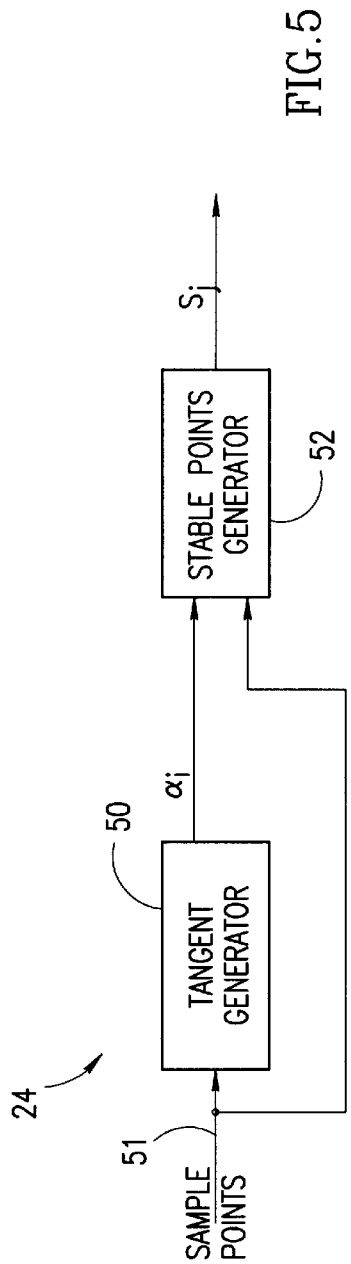
FIG. 5 is a block diagram illustration of elements of a tangent and stable point extractor forming part of the system of FIG. 2.

Reference is now made to FIG. 5 which details the elements of the tangent and stable point extractor 24. The extractor 24 comprises a tangent generator 50, connected to an input line 51 providing sample points, and a stable points generator 52 connected to the output of the tangent generator 50 and to the input line 51.

The tangent generator 50 receives the sample points of the input stroke and generates therefrom the tangent angles $\alpha_i$ at each point i, generally as follows:

$$\alpha_i = \frac{(Y_{i-4} - Y_{i+4})}{(X_{i-4} - X_{i+4})} = \frac{\Delta Y}{\Delta X} \quad (1)$$

When $\Delta X$ approaches 0, $\alpha_i$ is undefined and is provided a value indicating such and indicating in which quadrant $\alpha_i$ is.

The stable points generator 52 receives the sample points and the tangent angles $\alpha_i$ and determines the locations of the stable points $S_j$, where the determination is function of their definition. For example, the stable points $S_j$ can be defined as the points at which sharp changes of angle occur and/or the local minima and maxima in the vertical and/or horizontal directions. One definition of local maximum and minimum is that all of the points to the left and right of the present point i, within a small neighborhood are respectively either smaller than or larger than the present point i. One definition of sharp changes of angle is:

$$(\Delta X)^2 + (\Delta Y)^2 < Q \quad (2)$$

where Q is a threshold value and is typically small.

It is noted that the stable points generator 52 utilizes the coordinate information of the sample point and/or the tangent angles $\alpha_i$. It is further noted that, prior to operation of the system, extractor 24 determines the tangent angles $\alpha_{Ri}$ and stable points $S_j$ of the reference strokes and stores the results in database 28.

Figure 6:
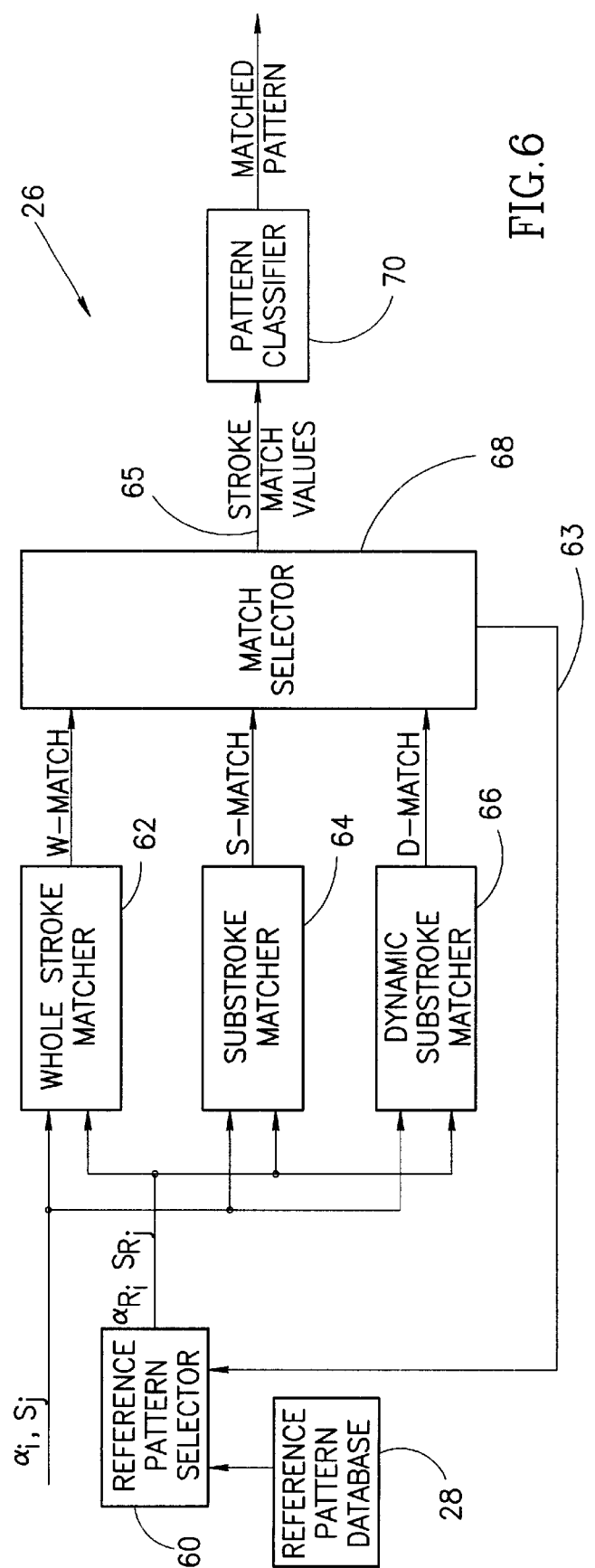
FIG. 6 is a block diagram illustration of elements of a stable point classifier forming part of the system of FIG. 2.

Reference is now made to FIGS. 6, 7A, 7B, 7C, 7D, 7E, 7F, 7G, 8A, 8B and 8C. FIG. 6 details the elements of the stable point classifier 26, FIGS. 7A–7G are useful in understanding the operation of elements of the classifier 26 and FIGS. 8A–8C detail the operations of elements of the classifier 26.

The stable point classifier 26 comprises a reference pattern selector 60, at least one of three matchers 62, 64 and 66, a match selector 68 and a pattern classifier 70. The reference pattern selector 60 is connected to each of the matchers 62, 64 and 66 whose output line, in turn, is connected to the match selector 68. A control output line 63 connects match selector 68 to the reference pattern selector 60 and a data output line 65 connects matcher match selector 68 to classifier 70.

The reference pattern selector 60 selects, from reference pattern database 28, a reference stroke to be compared to the input stroke and provides the tangent angles $\alpha_{Ri}$ and stable points $S_{Rj}$ of the reference stroke. The reference stroke can be an entire pattern or it can be one of the many strokes of the reference pattern.

The tangent angles $\alpha_i$ and $\alpha_{Ri}$ and the stable points $S_j$ and $S_{Rj}$ of the input stroke and selected reference stroke, respectively, are provided to at least one of the matchers 62–66 which compare substrokes of the input stroke, defined in different ways, to corresponding substrokes of the reference stroke and generate a match value for the reference stroke. Selector 68 selects, from the outputs of the matchers 62, 64 and 66, the match value which indicates the closest match. Control is then returned to the reference pattern selector 60 and a new reference stroke, which can be another stroke of the multi-stroke pattern, is selected. The match values for each reference stroke are provided to the pattern classifier 70 which utilizes them to classify the input stroke, as described hereinbelow.

The matchers 62, 64 and 66 each define the substrokes of the stroke in different ways. However, they operate in accordance with similar principles. The substroke, or substrokes, is divided into N equal length intervals having comparison points at the connection of two intervals. In FIGS. 7A–7E, three comparison points 84 are shown for each substroke, it being understood that typically many more are utilized. The tangent angles $\alpha_{mi}$ and $\alpha_{mRi}$ of the comparison points of the input and reference strokes, respectively, are noted.

For each substroke, no matter how it is defined, the matchers 62, 64 and 66 generate the difference angles between the input tangent angles $\alpha_{mi}$ and their corresponding reference tangent angles $\alpha_{mRi}$ and then generate the sum of the difference, typically not modulo 360 or $\pi$. If the input stroke is divided into more than one substroke, the matchers 62, 64 and 66 divide the sum for each substroke by its portion of the input stroke. The sum of the normalized totals is the match value for the reference stroke.

Figure 7A:
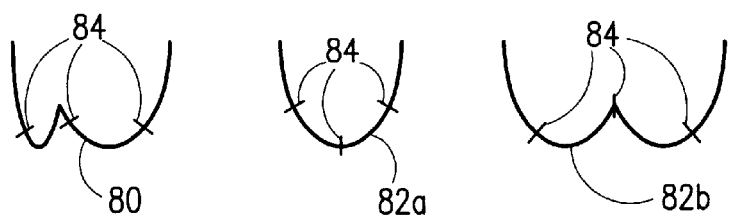
Figure 7B:
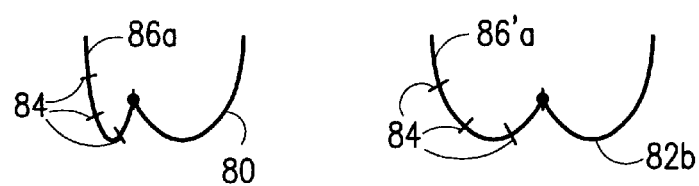
Figure 7C:
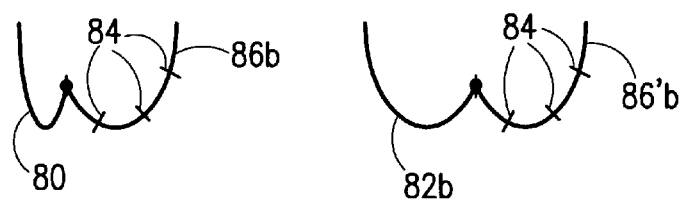

Matcher 62 is a whole stroke matcher for whom there is a single stroke comprised of the entire stroke. FIG. 7A illustrates the operation of matcher 62 on an input stroke 80 which is one type of "w", and on two reference strokes 82a, a "u", and 82b, another "w". As can be seen, all three strokes are divided into four intervals with three comparison points 84. The input stroke 80 is better matched to reference stroke 82b.

Matcher 64 is a substroke matcher which divides the input stroke into the M substrokes defined by its stable points. The input stroke 80 is compared only to those reference strokes 82 also having M substrokes and the comparison involves comparing the corresponding substrokes one to each other. In the example shown in FIGS. 7B and 7C, which illustrate the input stroke 80 and the reference stroke 82b, there is a single stable point at the sharp angle change of the "w" of strokes 80 and 82b. The two substrokes, labeled 86a and 86b, of the input stroke are compared to their corresponding substrokes 86'a and 86'b of the reference stroke 82b. Each substroke 86 and 86' has the same number (N−1, where N is the number of equal length intervals) of comparison points 84, the corresponding ones of which are compared to each other.

Matcher 66 is a dynamic substroke matcher which matches an input stroke to a reference stroke which does not have the same number of stable points. Typically, the difference k in stable point number is less than five. To do so, matcher 66 repeatedly ignores k different stable points of the stroke (input or reference) having the most stable points. The number of repetitions which must be performed is a permutation depending on the higher number of stable points and on the difference value k.

The match values for each reference stroke are provided to the pattern classifier is 70. If the input pattern is a multi-stroke pattern, the classifier 70 weights the match value for each of the reference strokes of the reference pattern by the portion they represent of the input pattern. The match value for each multi-stroke reference pattern is the sum of the weighted match values for its component strokes. The classifier 70 classifies the input pattern (single or multi-stroked) as the reference pattern for which the match value indicates the closest match.

FIGS. 7D–7G illustrate the operation of matcher 66 on an input stroke 90 of a "w" with a serif 91 and a reference stroke 94 of a "w" without the serif. The input stroke 90 has two stable points 92a and 92b and the reference stroke 94 has one stable point. Thus, for each matching operation, one of the two stable points 92a and 92b of the input stroke must be ignored. Since there are two stable points in input stroke 90 and only one in reference stroke 94, there are two possible combinations of stable points (either 92a or 92b) and thus, matcher 66 must perform two repetitions. For both repetitions, the substroke division of the reference stroke (being the stroke with the lower number of stable points) is the same; it is divided into substrokes 96f and 96g.

Figure 7D:
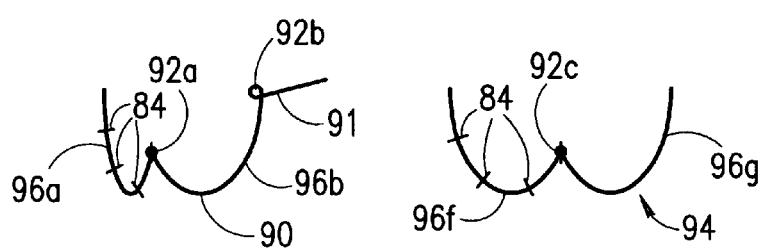
Figure 7E:
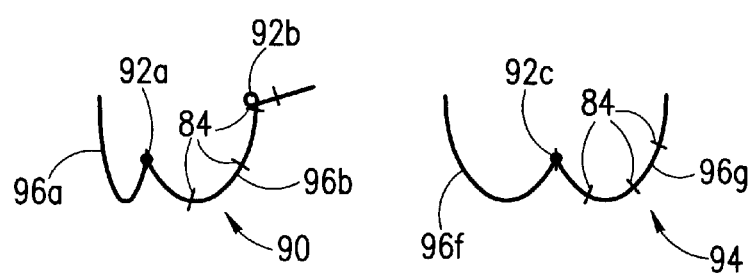

In one match, shown in FIGS. 7D and 7E, matcher 66 utilizes stable point 92a, and separates input stroke 90 into the two substrokes 96a and 96b, which are the left and right portions of the letter "w", respectively. In the second match, shown in FIGS. 7F and 7G, matcher 66 utilizes stable point 92b and separates the input stroke 90 into the two substrokes 96c and 96d, which are the letter and the serif portions, respectively. The reference stroke 94 is divided into two substrokes 96f and 96g in both situations. Substrokes 96a and 96c of the input stroke 90 are compared to substroke 96f of the reference stroke 94 and substrokes 96b and 96d of stroke 90 are compared to substroke 96g of stroke 94.

In all cases, the substrokes 96a–96d and 96f–96g have three equidistant comparison points 84 each. The sizes of the intervals between the comparison points 84 vary based on the length of the substroke 96. Thus, in FIG. 7G, the comparison points 84 on substroke 96d (the serif 91) are very close together and are compared to the spread apart comparison points 84 of substroke 96g.

Figures 8A, 8B:
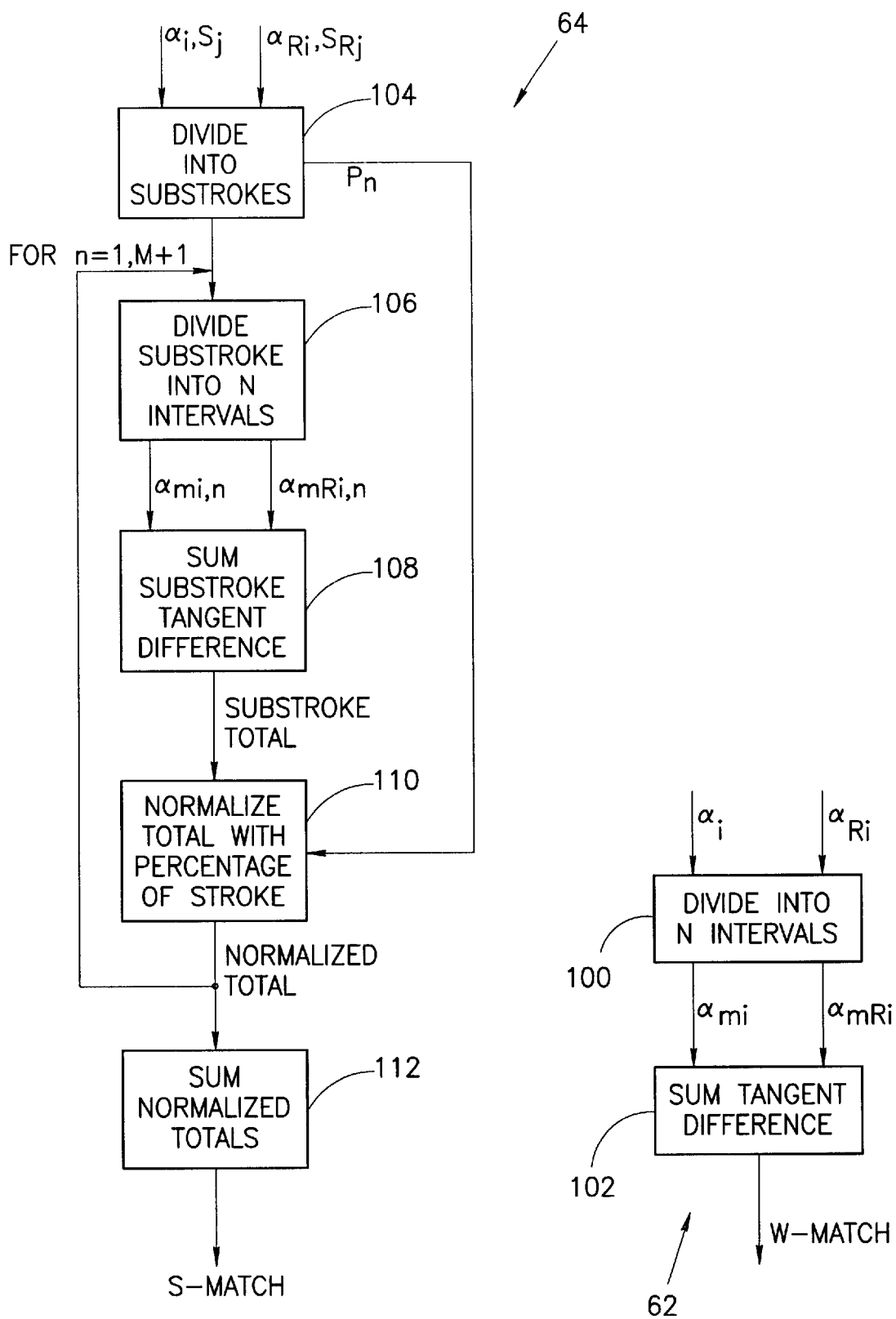
FIGS. 8A, 8B and 8C are flow chart illustrations of operations of three different types of matchers forming part of the classifier of FIG. 6.
Figure 8C:
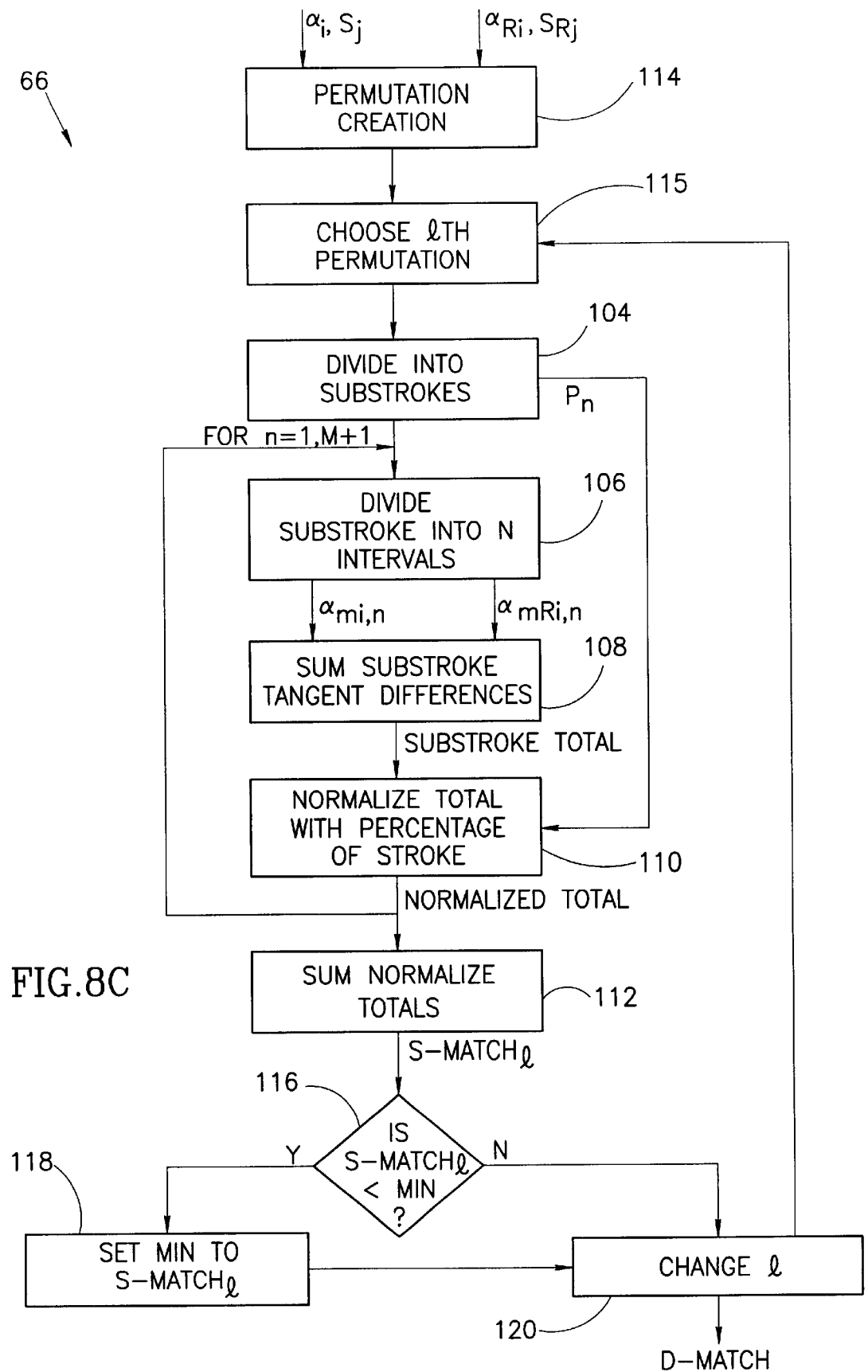

FIGS. 8A, 8B and 8C detail the operations of the matchers 62, 64 and 66, respectively. As shown in FIG. 8A, whole stroke matcher 62 receives the sample points $\alpha_i$ and $\alpha_{Ri}$ of the input and reference strokes, respectively, and, in the step labeled 100, divides the two strokes into N intervals and outputs the comparison points $\alpha_{mi}$ and $\alpha_{mRi}$, at the connection points of the intervals. In step 102, matcher 62 determines the match value W-MATCH which is the sum of the tangent differences at the points $\alpha_{mi}$ and $\alpha_{mRi}$, as follows:

$$W - MATCH = \sum_{i=1}^{N-1} \alpha_{mi} - \alpha_{mRi} \quad (3)$$

Matcher 62 then outputs the match value W-MATCH to match selector 68.

Substroke matcher 64 performs similar operations to that of matcher 62 but on substrokes rather than on whole strokes. Specifically, in step 104 (FIG. 8B), matcher 64 utilizes the stable points Si and SRJ to divide the input and reference strokes, respectively, into their M+1 input and reference substrokes. The index n is utilized to indicate the substroke number. In step 104 the matcher 62 also determines the length of each substroke n as a percentage $P_n$ of the whole stroke length.

In step 106, the matcher 64 divides each input and reference substroke into the same N intervals, determining thereby the comparison points $\alpha_{mi,n}$ and $\alpha_{mRi,n}$, respectively, for each substroke. In step 108 matcher 64 determines the sum of the tangent differences at the comparison points $\alpha_{mi,n}$ and $\alpha_{mRi,n}$, as follows:

$$TOTAL_n = \sum_{i=1}^{N-1} \alpha_{mi,n} - \alpha_{mRi,n} \quad (4)$$

In step 108, the substroke totals $TOTAL_n$ are normalized by the percentage $P_n$ of the stroke represented by the substroke n. More formally:

$$NT_n = \frac{TOTAL_n}{P_n} \quad (5)$$

Finally, in step 110, the normalized totals $NT_n$ are summed to produce the stroke match value S-MATCH.

Dynamic matcher 66 performs similar operations to those of substroke matcher 64 except that the definition of a substroke is different. In step 114 (FIG. 8C), the value of k is determined from the difference in the number of stable points in the reference and input strokes and the various permutations of k stable points to be ignored (of the stroke having the most stable points) are generated. In step 115, the lth set of k stable points is ignored. The operations of the substroke matcher 64 are then performed on the substrokes produced from the remaining stable points. In other words, steps 104–112 of FIG. 8B are performed by dynamic matcher 66 and therefore, in the interest of conciseness, their description will not be repeated herein.

The output of step 112 is the stroke match value S-MATCH$_l$ for the lth permutation. In step 116, the stroke match value S-MATCH$_l$ is compared to the present minimum value MIN, where MIN is initially set to any very large number. If S-MATCH$_l$ is smaller, in step 118, MIN is set to S-MATCH$_l$; otherwise, MIN is left as is. In step 120, the value of l is changed and control is returned to step 115 to select the next set of stable points to be ignored. When all sets of stable points to be ignored have been processed, the resultant value of MIN is output as the dynamic match value D-MATCH.

It will be appreciated by persons skilled in the art that the present invention is not limited to what has been particularly shown and described hereinabove. Rather the scope of the present invention is defined only by the claims which follow:

What is claimed is:

1. A handwritten stroke recognition system for recognizing which, of a plurality of reference strokes, matches an input stroke wherein the input and reference strokes have a plurality of sample points, the system comprising:
   a reference database for storing tangents of sample points of said reference strokes and stable points of said reference strokes, wherein said stable points are points which generally define the shapes of different types of strokes;
   a tangent and stable point extractor for determining tangents to at least some of said sample points of said input stroke and for determining which of said sample points between a beginning and end of said input stroke are the stable points of said input stroke; and
   a stable-point-based classifier for defining substrokes of each of said input stroke and said reference strokes as portions of said strokes having at least one of said stable points at an end thereof, for generating a predetermined number N of generally equally spaced sample points within each substroke, for generating stroke match values indicating the quality of the match between said input stroke and said reference strokes based on a sample-by-sample comparison of said N sample points of each of said substrokes of said input stroke with corresponding said N sample points of said corresponding substrokes of said reference strokes and for selecting the reference stroke providing the best match to said input stroke in accordance with a matching criterion.

2. A system according to claim 1 and wherein said stable points are points which characterize the shape of said input and reference strokes.

3. A system according to claim 1 and wherein said stable-point-based classifier comprises:
   at least one of:
      a substroke matcher comprising:
         substroke means for dividing said input stroke and those of said reference strokes having the same number of stable points as said input stroke into input and reference substrokes, respectively, in accordance with their respective stable points;
         substroke comparison point means for selecting comparison sample points of said input and reference substrokes, said comparison sample points dividing, respectively, said input and reference substroke into a plurality N−1 of equal length intervals;
         substroke comparison means for comparing said tangent angles of said comparison sample points of said input substrokes with tangent angles of corresponding ones of said comparison sample points of each of said reference substrokes and for producing a substroke comparison value for each reference substroke; and
         substroke match means for producing a match value indicative of said comparison, wherein each substroke comparison is weighted by the percentage length of said input substroke within said input stroke;
      a dynamic matcher for comparing said input stroke with those of said reference strokes having a different number of stable points than said input stroke, said dynamic matcher comprising:
         dynamic substroke means for dividing said input stroke and one of the appropriate reference strokes into input and reference substrokes, respectively, wherein said division of the one of said input stroke and the reference stroke to be compared having the most stable points is in accordance with all but a set of k of its stable points and wherein said division of the other of said input stroke and the reference stroke to be compared is in accordance with all of its stable points;
         dynamic comparison means for selecting comparison sample points of said input and reference substrokes, said comparison sample points dividing, respectively, said input and reference substrokes into a plurality N−1 of equal length intervals;
         dynamic comparison means for comparing said tangent angles of said comparison sample points of said input substrokes with tangent angles of corresponding ones of said comparison sample points of each of said reference substrokes and for producing a substroke comparison value for each reference substroke;
         dynamic match means for producing a match value indicative of said comparison, wherein each substroke comparison is weighted by the percentage of length of said input substroke within said input stroke; and
         means for changing which set of said k stable points is to be ignored by said dynamic substroke means, for receiving the match value output of said dynamic match means for each division into substrokes, and for selecting as output the match value output having the best value in accordance with a matching criterion.

4. A system according to claim 3 and wherein said stable-point-based classifier also comprises:
   a whole stroke matcher comprising:
      whole stroke comparison point means for selecting comparison sample points of said input stroke and said reference strokes which, respectively, divide said input stroke and said reference strokes into a plurality of equal length intervals;
      whole stroke comparison means for comparing said tangent angles of said comparison sample points of said input stroke with tangent angles of corresponding ones of said comparison sample points of each of said reference strokes and for producing a comparison value for each reference stroke; and
      whole stroke match means for producing a match value indicative of said comparison value for each reference stroke.

5. A system according to claim 4 and also comprising a match selector receiving the match value outputs of at least two of said substrokes, dynamic and whole stroke matchers for selecting a reference stroke based on which one of said match value outputs has the best match in accordance with a matching criterion.

6. A system according to claim 1 and wherein said stable points are at least one of points of sharp angle changes, local minima in the vertical direction, local minima in the horizontal direction, local maxima in the vertical direction and local maxima in the horizontal direction.

7. A handwritten pattern recognition system for recognizing which, of a plurality of reference patterns, matches an input pattern wherein the input and reference patterns are single- or multi-stroke patterns whose strokes are each formed of a plurality of sample points, the system comprising:
   a reference database for storing tangents of sample points of said reference strokes and stable points of said reference strokes, wherein said stable points are points which generally define the shapes of different types of strokes;

a tangent and stable point extractor for determining tangents to at least some of said sample points of an input stroke of said input pattern and for determining which of said sample points between a beginning and end of said input stroke are the stable points of said input stroke; and a stable-point-based classifier for defining substrokes of each of said input stroke and said reference strokes as portions of said strokes having at least one of said stable points at an end thereof, for generating a predetermined number N of generally equally spaced sample points within each substroke, for generating stroke match values indicating the quality of the match between said input stroke and said reference strokes based on a sample-by-sample comparison of said N sample points of each of said substrokes of said input stroke with corresponding said N sample points said corresponding substrokes of said reference strokes, for generating pattern match values, for multi-stroke patterns, indicating the quality of the match between said input pattern and said reference patterns based on said stroke match values for each stroke of said multi-stroke input and reference patterns and for selecting the reference pattern or stroke providing the best match to said input pattern or stroke in accordance with a matching criterion.

8. A system according to claim 7 and wherein said stable points are points which characterize the shape of said input and reference strokes.

9. A system according to claim 7 and wherein said stable-point-based classifier comprises:

at least one of:

a substroke matcher comprising:

substroke means for dividing said input stroke and those of said reference strokes having the same number of stable points as said input stroke into input and reference substrokes, respectively, in accordance with their respective stable points;

substroke comparison point means for selecting comparison sample points of said input and reference substrokes, said comparison sample points dividing, respectively, said input and reference substroke into a plurality N−1 of equal length intervals;

substroke comparison means for comparing said tangent angles of said comparison sample points of said input substrokes with tangent angles of corresponding ones of said comparison sample points of each of said reference substrokes and for producing a substroke comparison value for each reference substroke; and substroke match means for producing a match value indicative of said comparison, wherein each substroke comparison is weighted by the percentage length of said input substroke within said input stroke;

a dynamic matcher for comparing said input stroke with those of said reference strokes having a different number of stable points than said input stroke, said dynamic matcher comprising:

dynamic substroke means for dividing said input stroke and one of the appropriate reference strokes into input and reference substrokes, respectively, wherein said division of the one of said input stroke and the reference stroke to be compared having the most stable points is in accordance with all but a set of k of its stable points and wherein said division of the other of said input stroke and the reference stroke to be compared is in accordance with all of its stable points;

dynamic comparison means for selecting comparison sample points of said input and reference substrokes, said comparison sample points dividing, respectively, said input and reference substrokes into a plurality N−1 of equal length intervals;

dynamic comparison means for comparing said tangent angles of said comparison sample points of said input substrokes with tangent angles of corresponding ones of said comparison sample points of each of said reference substrokes and for producing a substroke comparison value for each reference substroke;

dynamic match means for producing a match value indicative of said comparison, wherein each substroke comparison is weighted by the percentage of length of said input substroke within said input stroke; and means for changing which set of said k stable points is to be ignored by said dynamic substroke means, for receiving the match value output of said dynamic match means for each division into substrokes, and for selecting as output the match value output having the best value in accordance with a matching criterion.

10. A system according to claim 9 and wherein said stable-point-based classifier also comprises:

a whole stroke matcher comprising:

whole stroke comparison point means for selecting comparison sample points of said input stroke and said reference strokes which, respectively, divide said input stroke and said reference strokes into a plurality of equal length intervals;

whole stroke comparison means for comparing said tangent angles of said comparison sample points of said input stroke with tangent angles of corresponding ones of said comparison sample points of each of said reference strokes and for producing a comparison value for each reference stroke; and whole stroke match means for producing a match value indicative of said comparison value for each reference stroke.

11. A system according to claim 10 and also comprising a match selector receiving the match value outputs of at least two of said substrokes, dynamic and whole stroke matchers for selecting a reference stroke based on which one of said match value outputs has the best match in accordance with a matching criterion.

12. A system according to claim 7 and wherein said stable points are at least one of points of sharp angle changes, local minima in the vertical direction, local minima in the horizontal direction, local maxima in the vertical direction and local maxima in the horizontal direction.

13. A method for recognizing which, of a plurality of handwritten reference strokes, matches a handwritten input stroke wherein the input and reference strokes have a plurality of sample points, the method comprising the steps of storing tangents of sample points of said reference strokes and stable points of said reference strokes, wherein said stable points are points which generally define the shapes of different types of strokes;

determining tangents to at least some of said sample points of said input stroke and determining which of said sample points between a beginning and end of said input stroke are the stable points of said input stroke;

defining substrokes of each of said input stroke and said reference strokes as portions of said strokes having at least one of said stable points at an end thereof;

generating a predetermined number N of generally equally spaced sample points within each substroke;

generating stroke match values indicating the quality of the match between said input stroke and said reference strokes based on a sample-by-sample comparison of said N sample points of each of said substroke of said input stroke with corresponding said N sample points of said corresponding substrokes of said reference strokes; and selecting the reference stroke providing the best match to said input stroke in accordance with a matching criterion.

14. A method according to claim 13 and wherein said stable points are points which characterize the shape of said input and reference strokes.

15. A method according to claim 13 and wherein said step of dividing comprises:

at least one of the steps of:
  dividing said input stroke and those of said reference strokes having the same number of stable points as said input stroke into input and reference substrokes, respectively, in accordance with their respective stable points; and
  for reference strokes having a different number of stable points as said input stroke, the step of dividing said input stroke and one of the appropriate reference strokes into input and reference substrokes, respectively, wherein said division of the one of said input stroke and the reference stroke to be compared having the most stable points is in accordance with all but a set of k of its stable points and wherein said division of the other of said input stroke and the reference stroke to be compared is in accordance with all of its stable points.

16. A method according to claim 13 and wherein said step of generating stroke match values comprises the steps of:

selecting comparison sample points of said input and reference substrokes, said comparison sample points dividing, respectively, said input and reference substrokes into a plurality of equal length intervals;

comparing said tangent angles of said comparison sample points of said input substrokes with tangent angles of corresponding ones of said comparison sample points of each of said reference substrokes and for producing a substroke comparison value for each reference substroke;

for reference strokes having the same number of stable points as said input stroke, weighing the substroke comparison value for each reference stroke by the percentage length of said input substroke within said input stroke and producing a match value therefrom; and for reference strokes having a different number of stable points as said input stroke, performing the following steps:
  i) weighing the substroke comparison value for each reference stroke by the percentage length of said input substroke within said input stroke and producing a match value therefrom; and
  ii) changing which set of said k stable points is to be ignored in said second step of dividing and selecting as output the match value output having the best value in accordance with a matching criterion.

17. A method according to claim 16 and wherein said step of generating stroke match values also comprises the steps of:

selecting comparison sample points of said input stroke and said reference strokes which, respectively, divide said input stroke and said reference strokes into a plurality N−1 of equal length intervals; and comparing said tangent angles of said comparison sample points of said input stroke with tangent angles of corresponding ones of said comparison sample points of each of said reference strokes and for producing a match value for each reference stroke.

18. A method for recognizing which, of a plurality of reference patterns, matches an input pattern wherein the input and reference patterns have at least one stroke formed of a plurality of sample points, the method comprising the steps of:

storing tangents of sample points of reference strokes of said reference patterns and stable points of said reference strokes, wherein said stable points are points which generally define the shapes of different types of strokes;

determining tangents to at least some of said sample points of an input stroke of said input pattern and for determining which of said sample points between a beginning and end of said input stroke are the stable points of the input stroke;

defining substrokes of each of said input stroke and said reference strokes as portions of said strokes having at least one of said stable points at an end thereof;

generating a predetermined number N of generally equally spaced sample points within each substroke;

generating stroke match values indicating the quality of the match between said input stroke and said reference strokes based on a sample-by-sample comparison of said N sample points of each of said substrokes of said input stroke with corresponding said N sample points of said corresponding substrokes of said reference strokes;

generating pattern match values, for multi-stroke patterns, indicating the quality of the match between said input pattern and said reference patterns based on said stroke match values for each stroke of said multi-stroke input and reference patterns; and selecting the reference pattern or stroke providing the best match to said input pattern or stroke in accordance with a matching criterion.

19. A method according to claim 18 and wherein said stable points are points which characterize the shape of said input and reference strokes.

20. A method according to claim 18 and wherein said step of dividing comprises:

at least one of the steps of:
  dividing said input stroke and those of said reference strokes having the same number of stable points as said input stroke into input and reference substrokes, respectively, in accordance with their respective stable points; and
  for reference strokes having a different number of stable points as said input stroke, the step of dividing said input stroke and one of the appropriate reference strokes into input and reference substrokes, respectively, wherein said division of the one of said input stroke and the reference stroke to be compared having the most stable points is in accordance with all but a set of k of its stable points and wherein said division of the other of said input stroke and the reference stroke to be compared is in accordance with all of its stable points.

21. A method according to claim 18 and wherein said step of generating stroke match values comprises the steps of:

selecting comparison sample points of said input and reference substrokes, said comparison sample points dividing, respectively said input and reference substrokes into a plurality N−1 of equal length intervals;

comparing said tangent angles of said comparison sample points of said input substrokes with tangent angles of corresponding ones of said comparison sample points of each of said reference substrokes and for producing a substroke comparison value for each reference substroke;

for reference strokes having the same number of stable points as said input stroke, weighing the substroke comparison value for each reference stroke by the percentage length of said input substroke within said input stroke and producing a match value therefrom; and for reference strokes having a different number of stable points as said input stroke, performing the following two steps:
  i) weighing the substroke comparison value for each reference stroke by the percentage length of said input substroke within said input stroke and producing a match value therefrom; and
  ii) changing which set of said k stable points is to be ignored in said second step of dividing and selecting as output the match value output having the best value in accordance with a matching criterion.

22. A method according to claim 21 and wherein said step of generating stroke match values also comprises the steps of:

selecting comparison sample points of said input stroke and said reference strokes which, respectively, divide said input stroke and said reference strokes into a plurality N−1 of equal length intervals; and comparing said tangent angles of said comparison sample points of said input stroke with tangent angles of corresponding ones of said comparison sample points of each of said reference strokes and for producing a match value for each reference stroke.

* * * * *